United States Patent Office 2,972,551
Patented Feb. 21, 1961

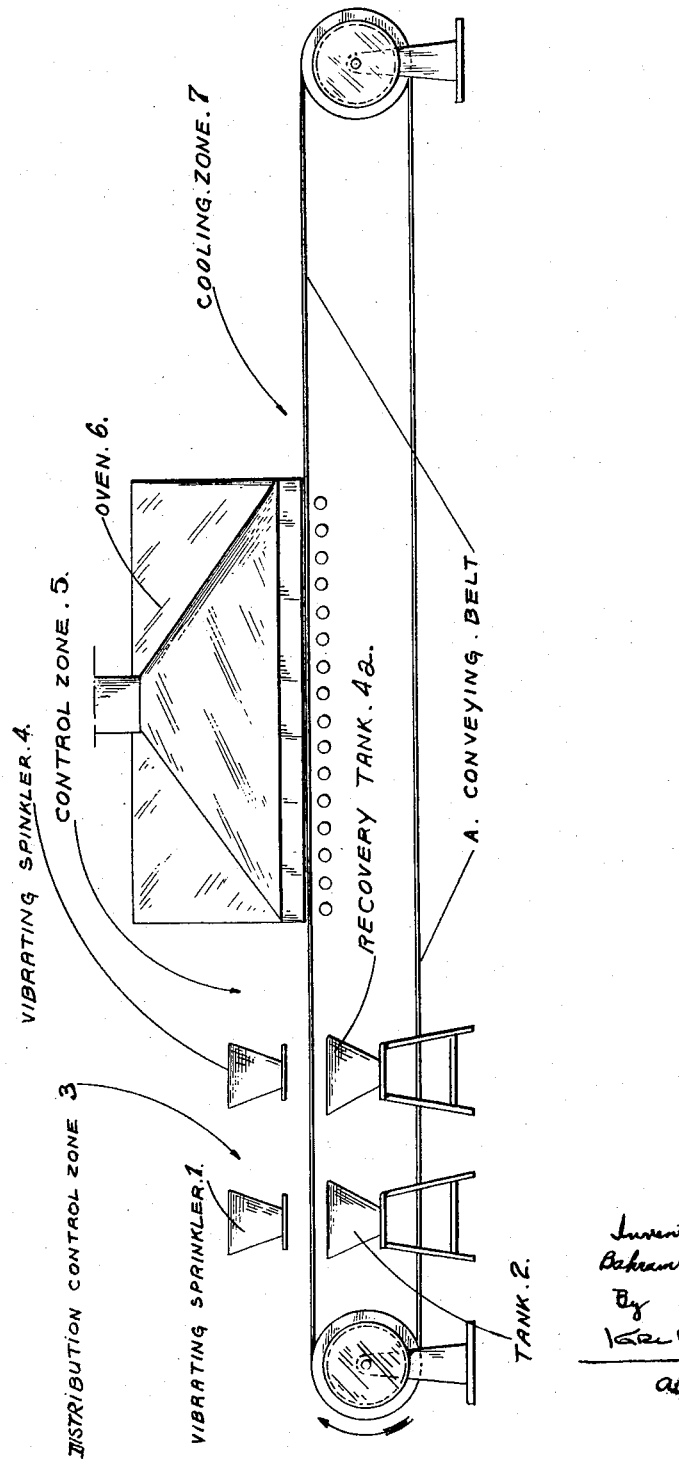

2,972,551

WELDING PROCESS FOR THE FIXATION OF METAL GRAINS TO A METALLIC SUPPORT FOR OBTAINING ABRASIVE OR ANTI-SLIP SURFACES

Bahram Fringhian, 36 Blvd. Suchet, Paris, France

Filed Sept. 16, 1958, Ser. No. 761,309

Claims priority, application France Sept. 23, 1957

1 Claim. (Cl. 117—31)

The present invention relates to an improved process for the welding of more or less hard metal grains to a metallic support, or base, of any desired shape, so as to obtain abrasive or anti-slip surfaces.

It is known to fix to a support, by means of a welding material, metal grains or non-weldable grains coated with weldable metal, so as to obtain rugous surfaces and particularly, abrasive surfaces. For this purpose, the welding material in suspension in lignite tar oil, is applied to the support, then the support is sprinkled with grains to be welded, and the whole is covered with sand, the temperature being raised sufficiently to cause the welding. However, one of the drawbacks common to the various known methods arises from the fact that the supply of heat by the sand becomes inadequate, as soon as the thickness of the support exceeds a certain value.

The present invention has for its object an improvement in the aforesaid methods, said improvement being characterised in that:

(1) The liquid for the suspension of the welding material is a comparatively viscous wetting agent, imparting to the final suspension good coating properties; it must, amongst its other characteristics, be an anti-oxidant.

(2) There is applied to the surface which is coated with such a suspension, a granulated product, inert towards the welding material and adapted for mechanically holding each grain in position by wrapping each of said grains.

A liquid, which is advantageous for suspending the material and complying with the aforesaid characteristics, is triethanolamine, for welds carried out at a fairly low temperature (comprised between about 180° and 250° C.), whereas, for high temperature-welds (between about 500 and 950° C.), the invention provides for the use of silicone oil, the viscosity of which is comprised between 100 and 200 centistokes at 25° C.

More specifically, for welds at fairly low temperatures, the suspension-liquid for the welding material has advantageously the following properties;

It must not react, in the cold state, on the metallic weld, thus insuring to the latter good storage properties;

It must not substantially react, in the hot state, on the metallic powder, before the latter has reached its melting point;

It must develop pickling properties while being decomposed;

It must be of such a nature that, if a residue is being formed upon decomposition or flaming thereof, such a residue should occur only at a temperature higher than the melting temperature of the welding powder; and Its decomposition should take place gradually at a temperature just above the melting point of the metallic powder.

The granulated product for keeping the grains in position, is either a pickling agent used alone or associated with sand. Examples of such a product advantageously include: ammonium chloride alone, or borax powder associated with sand. The welding materials, which can be put in suspension in triethanolamine for obtaining a weld at a low temperature, advantageously include a tin-weld containing 33%, 40% or 60% of tin, the remaining percentage consisting of lead.

Of course the final suspension may have alternatively added thereto, a pickling compound, such as ammonium chloride, in amounts of from 8 to 10% by weight.

For carrying out the process according to the invention, there are successively applied to the surface to be treated, first the welding material-suspension, then the grains to be welded; in the case of a low temperature welding, the surface having been thus treated, is coated with a sufficiently thick layer of ammonium chloride, and the whole is oven-heated to the desired temperature, in order to cause the welding material to melt. When the suspension liquid used is triethanolamine, there is a crust-formation under the action of ammonium chloride; the rigidity of this crust is sufficient to hold the grains in position, and it is free from sizable blisters, the presence of which would be detrimental in that the grains to be welded would be removed from their support.

As a suitable formulation, the following mixture can be cited for welding operations.

| | Grams |
|---|---|
| Powdered welding material | 850 |
| Triethanolamine | 150 |

An alternative formulation would be as follows:

| | |
|---|---|
| Powdered welding material | 700 |
| Pickling agent ($NH_4Cl$) | 70 |
| Triethanolamine | 230 |

This formulation is particularly suitable for the fixation of steel grains, of shot, of bronze grains, etc. to metal supports or bases, such as steel sheets, galvanised steel sheets, copper, brass, aluminum sheets or stainless steel sheets, which have been previously treated in order to enable the grains to be fixed to the surfaces thereof.

The following table, given by way of explanation and without limiting the invention, indicates the amount of welds to be used per square meter, for grains in the usual size-range:

Table

| U.S. Sieve number (U.S. Bureau of Standards) | 14 | 16 | 24 | 30 |
|---|---|---|---|---|
| Weld (grams) | 1,800 | 1,600 | 1,400 | 1,200 |
| Grains (grams) | 1,200 | 1,000 | 800 | 700 |
| Ammonium chloride (grams) | 2,000 | 2,000 | 2,000 | 2,000 |

A suitable selection of the amount of welding material with respect to the grains enables the protrusion of the grains to be adjusted at will in relation to the support.

The above examples are advantageously used for weldings, at low temperatures. But when grains are to be fixed by means of the so-called "heavy" welds (at high temperatures), it is preferable to use brazing materials available in the trade under the name of white brazings (melting point at about 760° C.), Roman brazings (melting point at about 810° C.), grey brazings (850° C.), yellow brazings (950° C.), or merely pure copper, melting at 1050° C. (when ovens with a controlled atmosphere are used).

In this case, the suspension-liquid must be such that, if during the decomposition thereof, occurring much before the melting of the brazings, it generates a solid product, the latter should not adhere to the support and grain-surfaces, so as to enable the welding to be made. As an advantageous liquid, meeting the above requirements, there can be cited the silicone oil, which decomposes into pulverulent $SiO_2$ and into $CO_2$, and preferably a silicone oil, having a viscosity between 100 and 200 centistokes at 25° C., so as to obtain a suspension having the desired consistency, enabling it to be readily spread on the surface to be treated.

It will be understood, that the grains to be welded are distributed over the suspension-layer after the application of the latter to the said surface to be treated.

The following formulation embodies an advantageous composition:

| | Grams |
|---|---|
| Powdered brazing material | 750 |
| Pickling agent (commercial borax powder) | 150 |
| Silicone oil | 100 |

The following formulation is particularly suitable for use in ovens with a controlled atmosphere:

Finely divided copper powder _____ Sufficient amount.
Silicone oil _____ 900 grams.

The granulated covering material can advantageously consist in a pickling agent in association with sand, this pickling agent being either the same as in the above formulation, or of another kind.

For carrying out the process of the invention, there can advantageously be used the equipment, diagrammatically shown in the accompanying drawing, which is an elevational view.

In this drawing, the sheets to be treated, previously coated with the welding suspension on one of their faces, are conveyed on a conventional conveying belt A. They pass through a grain distributing device; in the drawing, this device, comprises by way of example, a vibrating sprinkler 1, the grains in excess being collected in a tank 2, located beneath the conveyor A; then the sheet, thus coated with the weld-suspension and with metal grains passes through a sheet coating device, said coating being effected either with NH₄Cl for low temperature welds, or with borax associated with sand, for high temperature welds. This device, as the former one, can comprise a vibrating sprinkler 4 and a recovery tank 4a, the sheet having previously passed through a distribution control zone 3. The sheet, having thus been coated, after having passed through a control zone 5, reaches an oven 6, where it is heated, at controlled or not controlled atmosphere, to a temperature which exceeds by about 50 to 100° C., the melting point of the welding material or of the brazing material used. After heating for a suitable length of time, the piece leaves the oven and passes through a cooling zone 7, then it is sent to the washing device, and contingently to a brushing device or other suitable finishing treatment.

It must be noted that the grains to be used for obtaining abrasive or anti-slip surfaces, can be of stainless steel, annealed steel having sharp and cutting edges, obtained by milling. There can also be used grains of metals, or alloys, of the hard metal class as for example tungsten carbide. The process also provides for the fixation of abrasive grains, in materials which are not directly weldable, but the fixation of which by welding is rendered possible by metallising their surface, such as for example, diamond grains or chippings previously metallised.

Among these various materials, used in a granulated form, having abrasive and cutting properties, and which, because of the nature of their surface can be used for rendering a surface anti-slipping, there are selected those which are most suitable for the article to be formed; in order to impart anti-slipping properties to surface of machine parts, or to surfaces of any articles, submitted to atmospheric or chemical agents likely to degrade the granulated metal, there are preferably used stainless-steel grains, obtained by crushing scrap, which is sufficiently hard for the purpose. For surfaces of articles not submitted to the action of these agents, there are used sharp-edged steel grains of the kind commonly employed for cleaning metallic surfaces by projection.

For the manufacture of abrasive tools, used for grinding cutting tools, there are used grains of tungsten carbide, of molybden, or grains of previously metallised diamond, distributed in one single layer and fixed to the metallic support.

A particularly advantageous feature of the above described process, is that the finished article is being obtained in one operation, as regards the fixation of the grains to be welded. And besides the fact that the article is obtained substantially free from irregularities (inherent to grain-coated surfaces) in any desired shape and having any desired section, the manufacturing expenses are substantially decreased.

I claim:

A method for preparing an anti-slip surface comprising a plurality of discrete weldable particles of hard metal having sharp and cutting edges, and welded to a metal support, which method comprises the successive steps of:

spreading on said support a tin-weld containing at least 33% of tin, in the form of a suspension in triethanolamine, distributing said metal particles in a single layer over the thus spread tin-weld, covering the whole with granulated ammonium chloride, then, heating said thus prepared surface to a temperature within the range of 180 to 250° C., triethanolamine and granulated ammonium chloride decomposing and reacting within said temperature range, to form a protective crust which holds said metal particles and said tin-weld in place during the welding.

References Cited in the file of this patent

UNITED STATES PATENTS

| 1,060,938 | Plathner et al. | May 6, 1913 |
| 2,290,338 | Koehring | July 21, 1942 |
| 2,339,208 | Van Der Pyl | Jan. 11, 1944 |
| 2,694,647 | Cole | Nov. 16, 1954 |
| 2,906,612 | Anthony et al. | Sept. 29, 1959 |